United States Patent [19]
Christopher, Jr. et al.

[11] 4,210,204
[45] Jul. 1, 1980

[54] METHOD FOR PLUGGING HIGH PERMEABILITY ZONES IN SUBTERRANEAN RESERVOIRS

[75] Inventors: Charles A. Christopher, Jr., Broken Arrow, Okla.; Alvin O. Clauset, Jr., Houston, Tex.

[73] Assignee: Texaco Inc., White Plains, N.Y.

[21] Appl. No.: 10,182

[22] Filed: Feb. 7, 1979

[51] Int. Cl.² .................. E21B 33/138; E21B 43/22
[52] U.S. Cl. ............................ 166/270; 166/273; 166/294
[58] Field of Search ............... 166/270, 273, 274, 275, 166/295, 300, 246

[56] References Cited
U.S. PATENT DOCUMENTS

| | | | |
|---|---|---|---|
| 1,998,756 | 4/1935 | Grebe et al. | 166/294 X |
| 2,681,704 | 6/1954 | Menaul | 166/294 X |
| 3,762,476 | 10/1973 | Gall | 166/273 X |
| 3,844,348 | 10/1974 | Stratton | 166/294 X |
| 3,848,673 | 11/1974 | Clampitt et al. | 166/294 X |
| 3,876,438 | 4/1975 | Friedman et al. | 166/294 X |
| 3,908,760 | 9/1975 | Clampitt et al. | 166/294 X |
| 3,949,811 | 4/1976 | Threlkeld et al. | 166/294 |
| 4,039,029 | 8/1977 | Gall | 166/294 |
| 4,120,361 | 10/1978 | Threlkeld et al. | 166/294 |

*Primary Examiner*—Stephen J. Novosad
*Assistant Examiner*—George A. Suchfield
*Attorney, Agent, or Firm*—Carl G. Ries; Robert A. Kulason; Gregory A. Cone

[57] ABSTRACT

Fresh water solutions of pectic materials are injected into high permeability zones in the subterranean reservoir wherein said materials upon contact with brine solutions form thick gels for the purpose of reducing the permeability of these high permeability zones thereby improving the vertical conformance efficiency of flooding operations within the reservoir.

13 Claims, 2 Drawing Figures

METHOD FOR PLUGGING HIGH PERMEABILITY ZONES IN SUBTERRANEAN RESERVOIRS

BACKGROUND OF THE INVENTION

1. Field of the Invention

This invention relates to an enhanced oil recovery method which comprises injecting a fresh water solution of a pectic substance selected from the group consisting of pectin, pectates and polygalacturonic acid and mixtures thereof into high permeability zones within the reservoir wherein the pectic substances upon contact with brine react to form thick gels thereby effectively reducing the permeability of the high permeability zones.

2. Description of the Prior Art

The crude oil which has accumulated in subterranean reservoirs is recovered or produced through one or more wells drilled into the reservoir. Initial production of the crude oil is accomplished by primary recovery techniques wherein only the natural forces present in the reservoir are utilized to produce the oil. However, upon depletion of these natural forces and the termination of primary recovery, a large portion of the crude oil remains trapped within the reservoir. Also, many reservoirs lack sufficient natural forces to be produced by primary methods from the very beginning. Recognition of these facts has led to the development and use of many enhanced oil recovery techniques. Most of these techniques involve injection of at least one fluid into the reservoir to produce an additional amount of the crude oil therefrom. Some of the more common methods are water flooding, polymer flooding, surfactant flooding, miscible flooding and caustic flooding.

Water flooding, which involves injection of water into the subterranean oil reservoir for the purpose of displacing the crude oil from the porous spaces of the reservoir rock towards the producing wells is the most economical and widely used of the enhanced oil recovery methods. However, water does not displace oil with high efficiency because of the immiscibility of water and oil as well as the high interfacial tension between them. Surfactant flooding involves the addition of one or more surface active agents or surfactants to the water flood for the purpose of minimizing the water flooding problems mentioned above.

Surfactant flooding has become an area of rapidly increasing interest in the last few years, especially in the United States as a large number of mature oil fields have begun to approach their economic limits of production under water flooding programs. Both water flooding and surfactant flooding operations as well as any other fluid flooding method, for that matter, must achieve at least a fair measure of vertical conformance efficiency in order for the flooding operation to be a success. Vertical conformance efficiency is a dimension-less number, usually expressed as a percentage, which is a measure of the reduction in efficiency of a flooding operation due to permeability variations within the reservoir. Indeed, most reservoirs display significant permeability variations throughout their volumes causing fluids to flow preferentially through the high permeability sections leaving portions of the reservoir with lower permeabilities essentially isolated from the effects of the injected fluids. One solution to this problem is to selectively plug the higher permeability streaks in order that the injected fluids be then forced into the previously unswept lower permeability portions of the reservoir. Several solutions have been proposed for this problem, but none has proved to be entirely successful.

SUMMARY OF THE INVENTION

An aqueous solution comprising fresh water and a pectic substance selected from the group consisting of pectins, pectates, polygalacturonic acids, and mixtures thereof is injected into a subterranean petroleum reservoir containing high permeability areas within the reservoirs. Upon entering these high permeability areas the injected aqueous solution contacts a brine which causes the pectate substance to form a gel thereby effectively plugging the high permeability areas within the reservoir.

DESCRIPTION OF THE PREFERRED EMBODIMENTS

Figure 2:
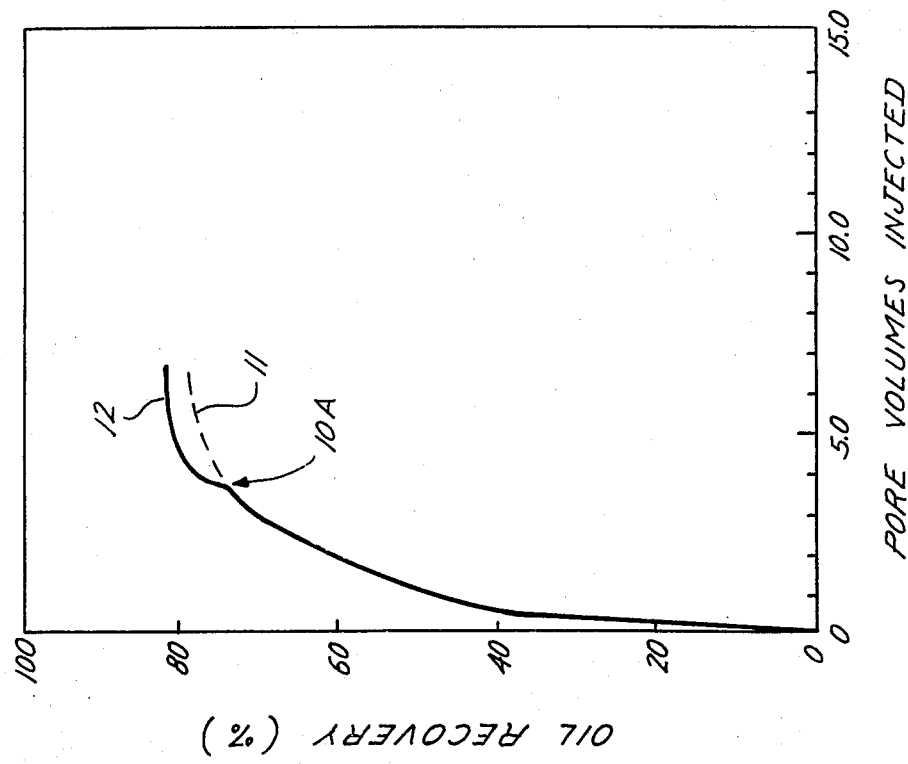
FIG. 2 is a graph describing the oil recovery effectiveness of the water flooding system as a function of the pore volumes of fluid injected into the system.

As noted above, one of the major problems concerning enhanced recovery projects involving the injection of a fluid into a reservoir is the marked tendency of the fluid to preferentially flow into and through high permeability areas or streaks within the reservoir while leaving much of the remaining of the reservoir untouched. Since the injected fluid tends to travel preferentially into these zones and sweep them free of oil, the relative permeability of these zones to water is increased. This in turn causes larger and larger fractions of the injected fluid to travel only into these zones thereby aggravating the problem. This problem of vertical conformance efficiency is particularly troubling in both water and surfactant flooding operations. Application of the method of this invention to water flooding and surfactant flooding projects to improve the vertical conformance efficiency of the reservoir represents one preferred usage. However, the method of this invention could be utilized to improve the vertical conformance efficiency of any porous reservoir containing zones of heterogenous permeability. It is limited only to those environments in which the pectic substance can form a stable gel.

The method of the invention comprises injecting a fresh water solution of a pectic substance into the underground reservoir wherein it flows preferentially into the high permeability areas and therein contacts a brine which causes the pectic substance to form a gel thereby effectively plugging the high permeability area. It is desirable to flush any brine out of the well bore with a small slug of fresh water prior to the injection of the aqueous solution of the pectic substance. It is also desirable to follow the injection of the aqueous solution of the pectic substance with the injection of brine in order to reinforce the gellation of the pectic substance in the formation.

The term "pectic substance" as used herein refers to pectins, pectates, polygalacturonic acids, and mixtures thereof. These substances are all complex organic polysaccharides and are produced chiefly from citrus fruit rind and apple pomace. The polygalacturonic acid referred to herein is composed of repeating units of the D-galacturonic acid unit shown below which are joined by alpha-(1→4) linkages.

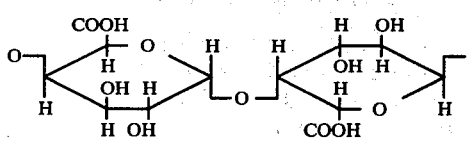

Pectin contains as its major component D-galacturonic methyl ester which is the methyl ester of a galacturan. However the galacturonic acid units are not fully esterified. The galacturan ethyl esters are linear molecules with molecular weights of approximately 30,000 to about 300,000. One such D-galacturonic acid unit with 50 percent of its carboxyl groups esterified is shown below.

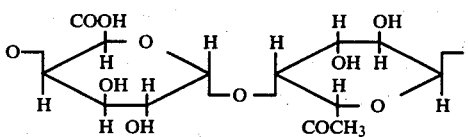

The term "pectate" refers to the salts of these polygalacturonic acids. Each of these substances is readily available through commercial channels. One source is Sunkist Growers Inc., located in Ontario, California.

Pectin has by far the greatest commercial usage of the three substances and is the source material from which the other two substances are derived. Pectin finds its greatest usage in the food industry where its characteristic of gelling or setting under suitable conditions, such as on addition of sugar to fruit juices and in the preparation of jams and jellies is utilized. It is commonly available as either a white powder or a syrupy concentrate, both forms being readily soluble in water. The gel-forming properties of pectin are related to the presence of the methyl ester group on the galacturonic acid unit. Also, all pectins have some free carboxylic groups, which are readily effected by multivalent ions such as calcium and magnesium. These ions can cross link in salt formation between carboxyl groups of adjacent molecules; and, depending upon the extent of such cross linking, this reaction can produce thickening, gelation or precipation.

These pectic substances will also form thick gels when contacted with salts such as sodium chloride, calcium chloride, magnesium chloride and the like, commonly found in oil field brines. We have discovered that this behavior can be utilized to plug high permeability areas within a porous reservoir. In this manner the vertical conformance efficiency of an enhanced oil recovery program can be increased resulting in increased production of petroleum fluids.

The following example demonstrates the effectiveness of the method of this invention.

EXAMPLE I

Two sand packs were connected parallel for a water flooding test. One sand pack was filled with 80/100 mesh sand, the other with 40/60 mesh sand. Both were saturated with the same oil, a Texaco 300® with a viscosity of 5.34 centipoise. The water flood was then commenced utilizing a synthetic brine consisting of water and 2 percent sodium chloride and at a differential pressure of 5 psi.

After 3.5 pore volumes of the synthetic brine had been injected, the system had reached the point of diminishing returns with a high water cut and rapidly decreasing oil recovery. As expected the sand pack filled with the 40/60 mesh sand was taking the vast majority of the water flood through it because of its higher permeability due to the larger size of the sand particles contained within the pack. At this point 18.6 ml (12.6 percent pore volume) of a solution of 2,000 mg/l sodium polypectate in distilled water was injected into the system. The sodium polypectate solution having a viscosity of 1.2 centipoise before injection mimicked the flow of the synthetic brine and entered almost exclusively into the 40/60 mesh sand pack. Water flooding with the synthetic brine was then resumed.

Figure 1:
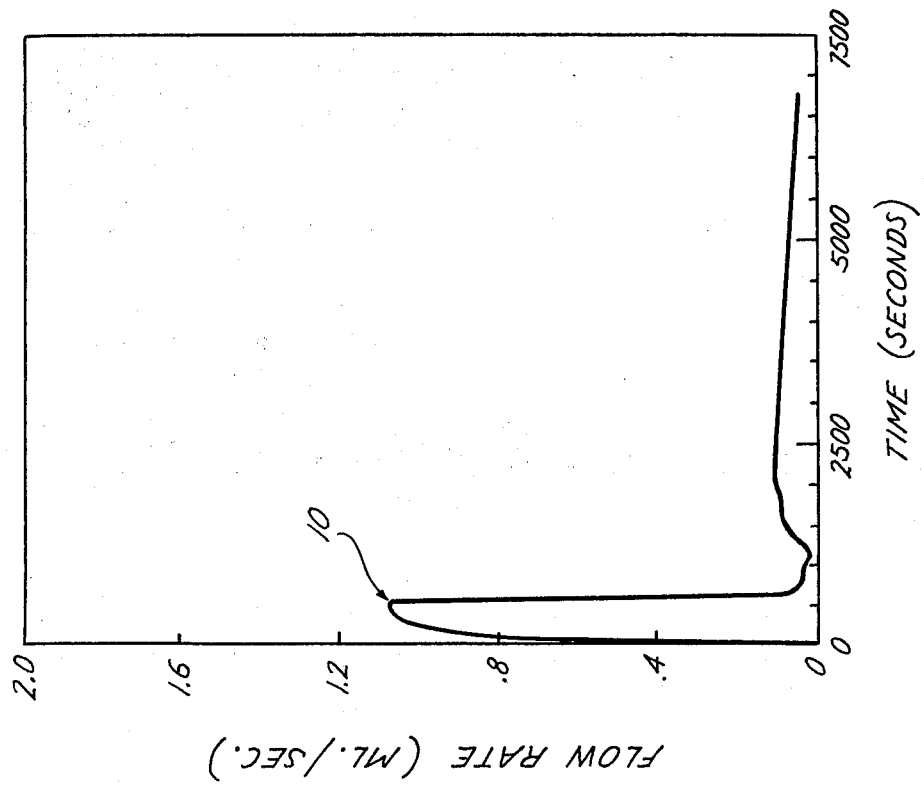
FIG. 1 describes the flow rate of a system undergoing water flooding as a function of time.

FIG. 1 is a graph of the flow rate of fluid in the system as a function of time and clearly shows that upon introduction of the sodium polypectate solution into the system at point 10 the flow rate decreased drastically from approximately 1.1 ml per second to almost 0. This was caused by the reaction of the sodium polypectate solution with the synthetic brine within the sand pack system to form a thick gel. This drastic reduction in flow rate indicated that the high permeability zones in the system have been effectively plugged. FIG. 2 is a graph depicting that the oil recovery effectiveness expressed as a percent of the percentage of the original oil in place recovered versus the number of pore volumes of fluid injected into the system. The curve takes on the expected parabolic shape indicating that oil recovery increases at a decreasing rate as more liquid is pumped through the system until it reaches point 10A at which time the sodium polypectate solution was injected into the system. At this point 10A, the curve is then displaced upwards as seen in the upper most segment of the curve 12. Without the injection of sodium polypectate solution the curve would have continued along the dashed line 11. The displacement between the curves 11 and 12 represents an additional quantity of oil that was recovered by the practice of the method of this invention that could not have been recovered otherwise.

Although this invention has been described in detail with reference one embodiment thereof many other embodiments are indeed possible. The volume of the injected aqueous pectic solution should be an amount sufficient to effectively plug the high permeability zones in the area of interest. This amount will vary with each reservoir but can be expected to range between about 0.01 and 0.5 pore volumes. Other pectic substances and other salts in varying concentrations may be utilized, the amounts and types of which are well within the expertise of one of ordinary skill in the art. This technique also can play an integral part in a conventional oil recovery process involving the injection of oil recovery fluids into the reservoir through injection wells and with resulting petroleum production from producing wells. Thus, the spirit and scope of the appended claims should not be limited to Example I described above.

We claim:

1. A method for plugging high permeability areas within a subterranean reservoir penetrated by at least one injection well and at least one production well, said wells being in fluid communication with each other, comprising injecting through at least one of said wells an effective amount of an aqueous solution comprising fresh water and a pectic substance selected from the group consisting pectins, pectates, polygalacturonic acids and mixtures thereof into said high permeability areas wherein the aqueous solution contacts a brine which causes the pectic substance to form a gel thereby effectively plugging the high permeability areas within the reservoir.

2. The method of claim 1 wherein, prior to the injection of the aqueous solution comprising fresh water and a pectic substance, a quantity of fresh water sufficient to displace any brine from the well is injected into the well.

3. The method of claim 1 wherein, after the injection of the aqueous solution comprising fresh water and a pectic substance, an effective quantity of brine comprising water and a salt selected from the group consisting of sodium chloride, calcium chloride and magnesium chloride is injected into the well.

4. The method of claim 1 wherein the pectic substance is pectin.

5. The method of claim 1 wherein the pectic substance is a pectate.

6. The method of claim 1 wherein the pectic substance is a polygalacturonic acid.

7. The method of claim 1 wherein the amount of the aqueous solution comprising fresh water and a pectic substance that is injected ranges from about 0.05 to about 0.50 pore volumes of the reservoir under treatment.

8. A method for recovering petroleum from a subterranean reservoir containing a least two separate strata with a permeability differential of more than 50 percent said reservoir being penetrated by a least one injection well and at least one production well, said wells being in fluid communication with each other, comprising:
 (a) injecting through at least one of said wells an effective amount of an aqueous solution comprising fresh water and a pectic substance selected from the group consisting of pectins, pectates, polygalacturonic acids and mixtures thereof, said aqueous solution preferentially entering the high permeability strata within the reservoir, contacting a brine therein and reacting to form a gel thereby effectively plugging the high permeability strata;
 (b) injecting an oil recovery fluid through at least one injection well into the lower permeability strata within the reservoir, said strata having remained essentially unaffected by the plugging action of (a);
 (c) forcing the oil recovery fluid through the reservoir; and
 (d) recovering petroleum from at least one of the production wells.

9. The method of claim 8 wherein, prior to step (a), a quantity of fresh water sufficient to displace any brine from the well is injected into the well.

10. The method of claim 8 wherein the pectic substance is pectin.

11. The method of claim 8 wherein the pectic substance is a pectate.

12. The method of claim 8 wherein the pectic substance is a polygalacturonic acid.

13. The method of claim 8 wherein the amount of the aqueous solution comprising fresh water and a pectic substance that is injected ranges from about 0.05 to about 0.50 pore volumes of the reservoir under treatment.

* * * * *